(12) United States Patent
Cascaval et al.

(10) Patent No.: US 7,610,266 B2
(45) Date of Patent: Oct. 27, 2009

(54) METHOD FOR VERTICAL INTEGRATED PERFORMANCE AND ENVIRONMENT MONITORING

(75) Inventors: Gheorghe C. Cascaval, Carmel, NY (US); Evelyn Duesterwald, New York, NY (US); Peter F. Sweeney, Spring Valley, NY (US); Robert W. Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 11/137,293

(22) Filed: May 25, 2005

(65) Prior Publication Data

US 2006/0271827 A1    Nov. 30, 2006

(51) Int. Cl.
 *G06F 17/30* (2006.01)
(52) U.S. Cl. .......................................... 707/2; 707/101
(58) Field of Classification Search ..................... 707/6, 707/2, 101
See application file for complete search history.

(56) References Cited

U.S. PATENT DOCUMENTS

| 5,767,634 | A | 6/1998 | Taylor | |
|---|---|---|---|---|
| 2004/0111708 | A1* | 6/2004 | Calder et al. | 717/131 |
| 2007/0143455 | A1* | 6/2007 | Gorman et al. | 709/223 |

OTHER PUBLICATIONS

Wisniewski, Robert W., et. al., " Efficient, Unified, and Scalable Performance Monitoring for Multiprocessor Operating Systems", Proceedings of the 2003 ACM/IEEE conference on Supercomputing, p. 1-14 [online], Nov. 2003. Internet:<URL: http://portal.acm.org/ft_gateway.cfm?id=1050154&type=pdf&coll=ACM&dl=ACM&CFID=35421056& CFTOKEN=77678412>.*

Vetter, Jeffrey et al., "Dynamic statistical profiling of communication activity in distributed applications", Proceedings of the 2002 ACM Sigmetrics, p. 240-250 [online], Jun. 2002. Internet: <URL: ttp://portal.acm.org/ft_gateway.cfm?id= 511364&type=pdf&coll=ACM& dl=ACM&CFID=35421056& CFTOKEN=77678412>.*

"Guide to Actuators" by Jones, et al., bioinstrumentation.mit.edu, Jul. 31, 2003.

* cited by examiner

*Primary Examiner*—Jean B. Fleurantin
*Assistant Examiner*—Dennis Myint
(74) *Attorney, Agent, or Firm*—Michael J. Buchenhorner; Douglas W. Cameron (57) ABSTRACT

A method for vertical integrated performance and environment monitoring includes steps, or acts, of: defining one or more events to provide a unified specification; registering one or more events to be detected; detecting an occurrence of at least one of the registered event or events; generating a monitoring entry each time one of the registered events is detected; and entering each of the monitoring entries generated into a single logical entity.

1 Claim, 5 Drawing Sheets

Summary of main interfaces

1. Event notification in event producers:

notifyEvent(event_type eventId, attr_type attribute1, attr_type attribute2,...);

2. Explicit logging in event producers or consumers:

errorCode logEvent(event_type eventId, attr_type attribute1, attr_type attribute2, ....);

3. Implicit logging:

handle_type registerLogging(eventSet_type, events, context_type context, integer_type sampleRate);

4. Statistics:

handle_type registerStatistics(eventSet_type events, context_type context, integer_type sampleRate, statistic_operation_type op attr_pointer_type attrs);

5. Call Backs:

handle_type registerCallback(event_type event, context_type context, interger_type sampleRate, (void (*callback) (void *));

6. Operations on logging, statistics and callback handles:

enable, disable, read, reset, unregister

*FIG. 6*

METHOD FOR VERTICAL INTEGRATED PERFORMANCE AND ENVIRONMENT MONITORING

STATEMENT REGARDING FEDERALLY SPONSORED-RESEARCH OR DEVELOPMENT

This invention was made with the Government support under Contract No.: NBCH30390004 awarded by Defense Advanced Research Projects Agency (DARPA). The Government has certain rights to this application.

FIELD OF THE INVENTION

This invention relates to the specification of an interface for monitoring performance and environment events across the execution layers in a computer system.

BACKGROUND OF THE INVENTION

Advances in software and hardware technologies and recent trends towards virtualization and standardization are rapidly adding to the complexity of the execution stack. As a result, performance tuning is turning into an increasingly challenging task for software developers. Complex interactions among execution layers need to be understood in order to properly diagnose and eliminate performance bottlenecks. The necessary foundation for assisting in and for ultimately automating the challenging task of performance tuning is an infrastructure for monitoring performance events across the execution layers of a system.

Performance events occur during normal operation in every execution layer of a computer system. The processing of performance events can result in performance bottlenecks.

A typical approach to detect and understand performance bottlenecks is to monitor the frequency and timing of performance events through a monitoring infrastructure. The monitoring infrastructure may be interactive, allowing dynamic configuration of the monitoring infrastructure. It may also include a Graphical User Interface (GUI) to enable this configuration as well as to process and display the performance monitoring data. The monitoring infrastructure may also provide an application programming interface (API) to enable the programming of tools that generate, consume, and process the monitoring information automatically. The API acts as an interface between the execution layers that emit notifications of events to a monitoring infrastructure and tools that consume and process the event information for analysis. The monitoring infrastructure API may provide specific protocols to tool developers to customize the monitoring activities to the needs of their tool. The execution layers emitting events to the monitoring infrastructure must obey the protocol specified by the API. The tools that use the monitoring infrastructure also must obey the protocol specified by the API in order to be able to consume the event information. There is thus a need for a flexible API that allows tool developers to enable and disable monitoring and specify the amount and type of monitoring information needed during each enabled time interval. Finally, there is also a need for a monitoring API that supports monitoring and processing of event information, both offline and online. Offline processing refers to stand-alone tools that post-analyze an event stream that was generated and gathered during execution and occurs after storing the monitoring data. Online processing refers to tools that process events as they occur, without storing them, for immediate use to drive online bottleneck detection and online performance tuning and optimization tools.

In prior art, performance monitoring infrastructure and its APIs have been focused on monitoring a single computer component or a single execution layer. Examples of performance monitoring APIs specific to an execution layer can be found across the execution layers. For the hardware layer, interfaces such as PAPI have been developed for programming hardware performance counters in a consistent manner across different architectures. See Performance Application Programming Interface (PAPI), http://icl.cs.utk.edu/papi/.

For the operating system layer, customized interfaces such as the interface for the trace facility in operating systems such as IBM's AIX, rtmon in SGI's IRIX, Linux's LTT and oprofile, etc., have been developed. On the Java Virtual Machine layer, JVMPI has been developed by Sun Microsystems as a standard API for monitoring a Java Virtual Machine. Sun Microsystems, Java Virtual Machine Profiler Interface (JVMPI), http://java.sun.com/j2se/1.4.2/docs/guide/jvmpi/.

For enterprise software layers, the ARM (Application Response Measurement) Standard has been developed as a uniform interface to calculate and measure the response time and status of work processed by the enterprise software applications. See the ARM Standard, which can be found in the web at http://www.opengroup.org/tech/management/arm/.

Other examples include an API for monitoring data warehouse activity and the usage of a qualification mask in periodic trace sampling of the application layer. See U.S. Pat. No. 6,363,391, "Application programming interface for monitoring data warehouse activity occurring through a client/server open database connectivity interface". Assignee: Bull, 2002; and U.S. Pat. No. 6,728,949, "Method and system for periodic trace sampling using a mask to qualify trace data."

Characteristic of such prior art is the focus on the performance events that are relevant to a single layer in the execution stack. The invention described here distinguishes itself from prior art in that it explicitly targets the integration and interaction across execution layers. Integration across execution layers involves (i) the ability to control and monitor events simultaneously from all layers, in order to correlate events from different execution layers; and (ii) the monitoring of events that result from the interactions among different execution layers.

Sun's DTrace provides a language, called "D" to program specific actions taken at selected instrumentation points. See Bryan M. Cantrill, Michael W. Shapiro, and Adam H. Leventhal, "Dynamic Instrumentation of Production Systems", Proceedings of the 2004 Annual Technical Conference USENIX'04, 2004. DTrace can analyze an event it receives from any portion of the execution stack, but DTrace is itself not an event based monitoring infrastructure, such as the prior art mentioned above. Rather, it is a basic code instrumentation facility, and the D language provided by DTrace could be used as a foundation to build event monitoring infrastructure.

In summary, the prior art in developing performance monitoring APIs has not yet provided complete integration across all execution layers of the computer system. Integration across execution layers requires the abstraction of basic monitoring functionality such as event counting and event processing to be uniformly applicable to events from all execution layers. This invention is the first approach to develop a rich set of uniform monitoring abstractions across all execution layers of a computer system.

SUMMARY OF THE INVENTION

Briefly, according to an embodiment of the invention, a method comprises steps, or acts, of: defining one or more events to provide a unified specification; registering one or more events to be detected; detecting an occurrence of at least one of the registered event or events; generating a monitoring entry each time one of the registered events is detected; and entering each of the monitoring entries generated into a single logical entity.

The method can also be implemented as machine executable instructions executed by a programmable information processing system or as hard coded logic in a specialized computing apparatus such as an application-specific integrated circuit (ASIC).

DETAILED DESCRIPTION

Figure 1:
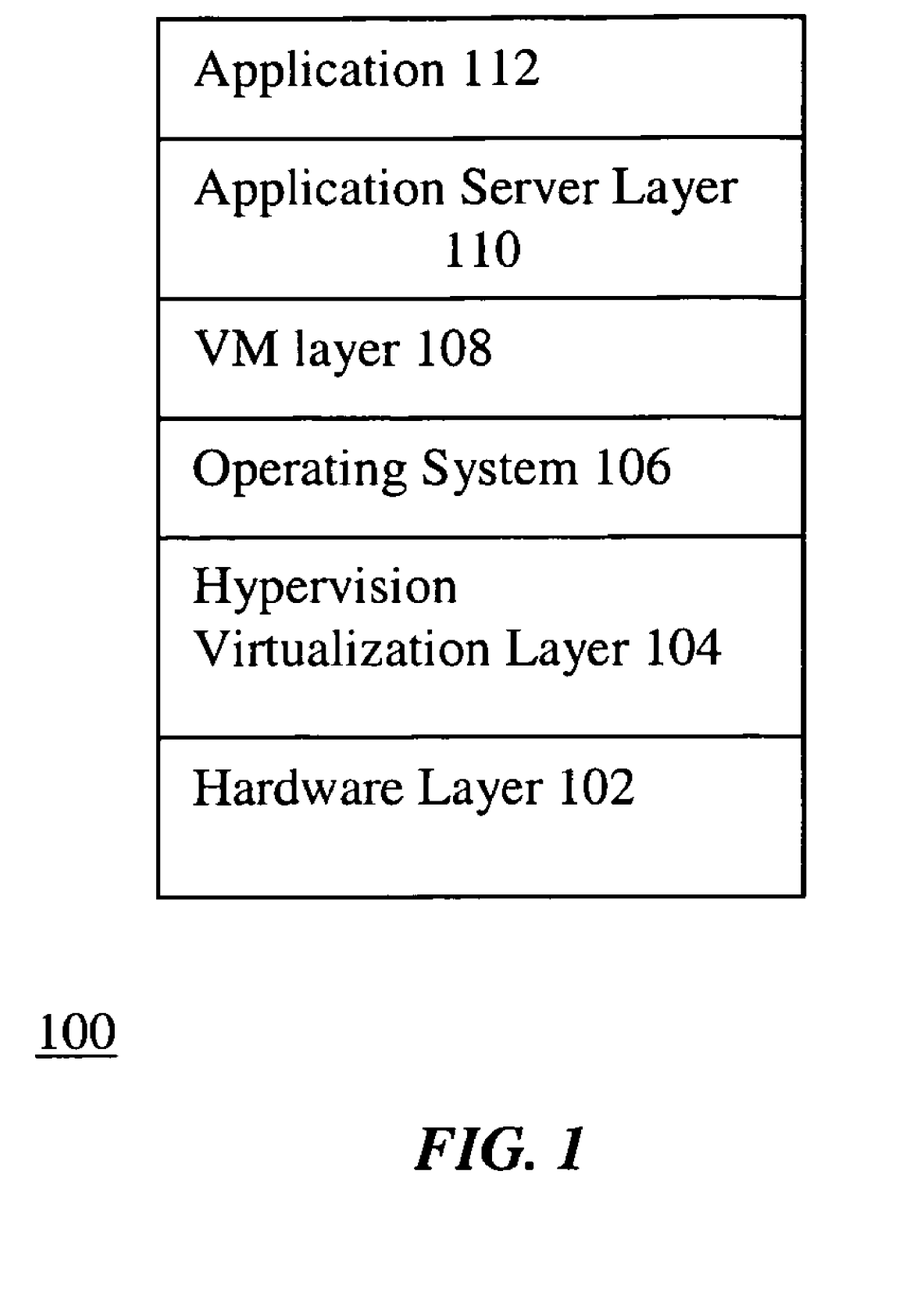
FIG. 1 shows the execution layers that make up a typical computer system, including hardware and software layers.

FIG. 1 shows an execution stack. The execution layers of the shown computer system include a hardware layer, such as IBM's POWERPC or Intel's Pentium architecture, a hardware virtualization layer such as a hypervisor or virtual machine monitor (VMM), an operating system such as IBM's AIX or Microsoft's Windows XP operating system, a language runtime layer, such as the Java Virtual Machine, an application server layer, such as IBM's Websphere, and the application layer, such as transaction software. Different execution stacks can have a combination of these layers, a minimal configuration comprising a hardware layer, an operating system layer, and an application layer. Each of the layers in an execution stack will generate multiple events during its execution. Examples of events are cache misses from the hardware layer, page fault events from the operating system layer, or transaction completion events from the application layer.

Figure 2:
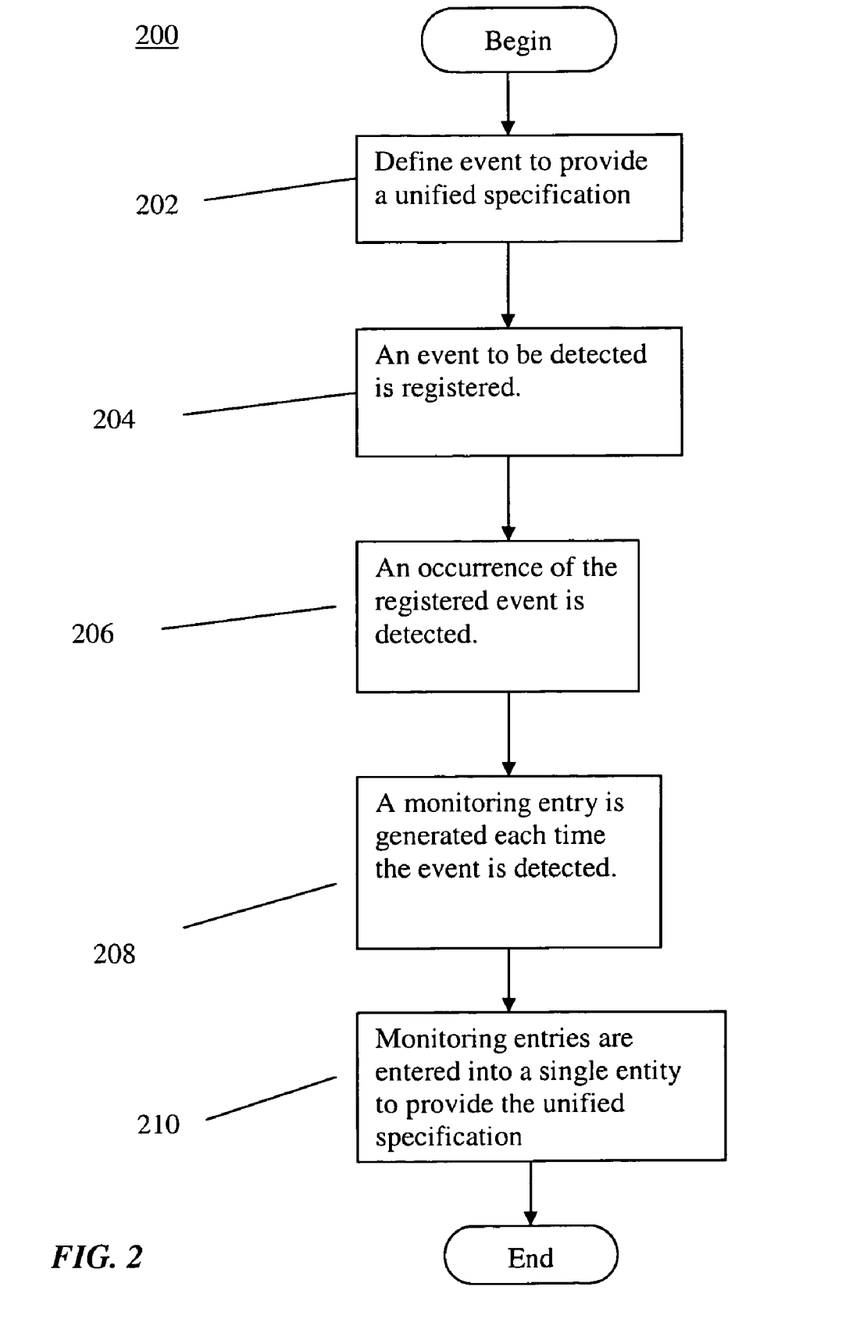
FIG. 2. is a flowchart of a method according to the invention.

Referring to FIG. 2, there is shown a flow chart illustrating an information processing method 200 for creating a unified specification for monitoring a computer system according to an embodiment of the invention. According to this embodiment, the method uses an API according to the invention. The method begins at step 202 where an event is defined to provide a unified specification. A global definition of events can be done during or before runtime. In step 204, the defined event is registered for detection. In step 206, an occurrence of the registered event is detected. In step 208, a monitoring entry is generated each time the event is detected. In step 210, monitoring entries are entered into a single logical entity. A single logical entity allows monitored events to be globally time stamped. Global time stamps allow events from different execution layers to be correlated, providing a means to help understand cause and effect relationships between events.

Figure 3:
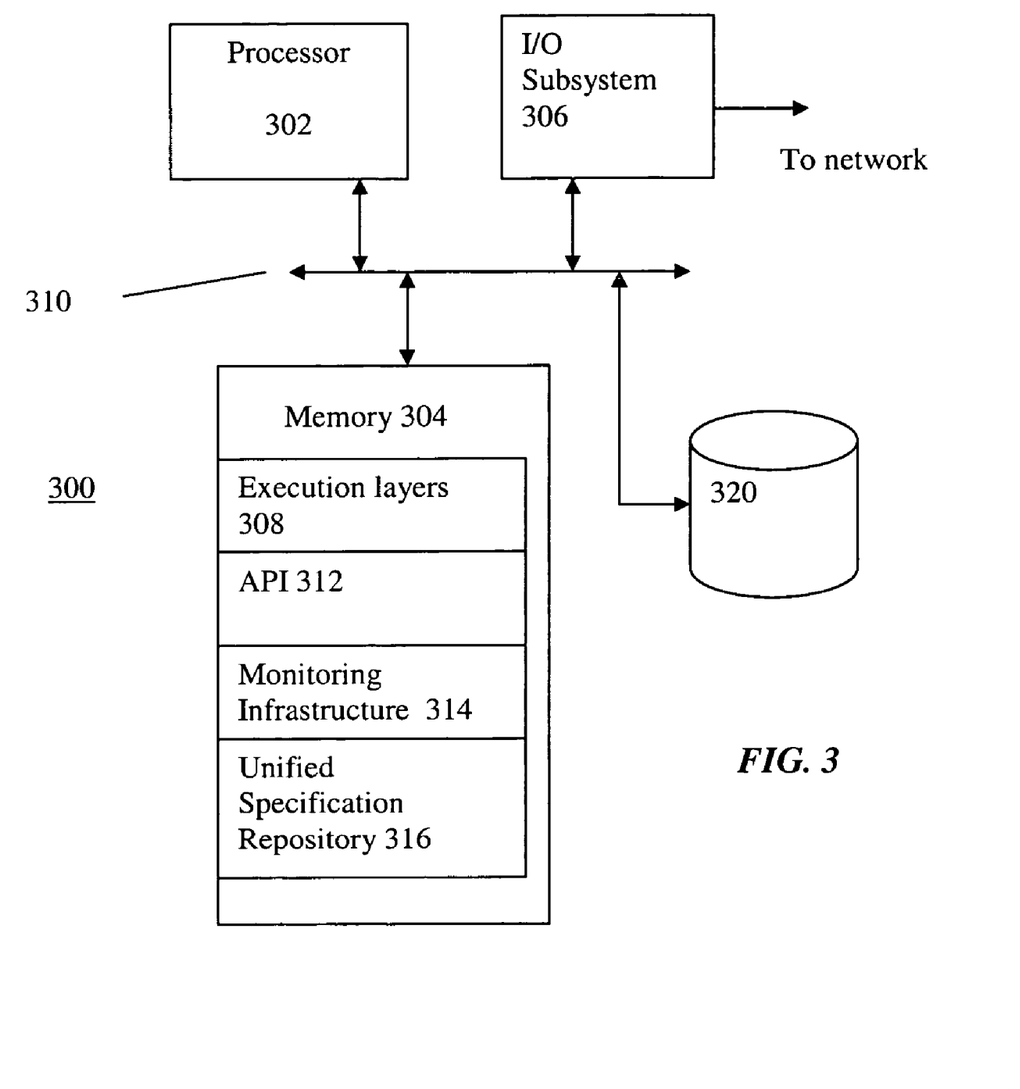
FIG. 3 is a high level block diagram showing an information processing system according to the invention.

Referring to FIG. 3, there is shown a block diagram of an information processing system 300 according to an embodiment of the invention. The system 300 comprises a processor 302, a memory subsystem 304, an input/output (I/O) subsystem 306, and a mass storage subsystem 320. These are linked by a bus 310. The I/O subsystem 306 may further comprise a connection to a network such as a local-area network (LAN) or wide-area network (WAN) such as the Internet.

The memory subsystem 304 contains a set of execution layers such as those depicted in FIG. 1. The memory 304 further comprises an API 312 according to an embodiment of the invention. The memory 304 further comprises a monitoring infrastructure 314 and a unified specification repository 316. What has been shown and discussed is a highly-simplified depiction of a programmable computer apparatus. These components are discussed further herein. Those skilled in the art will appreciate that other low-level components and connections are required in any practical application of a computer apparatus.

According to an embodiment of the invention, a computer readable medium, such as a CDROM can include program instructions for operating the programmable computer 300 according to the invention.

An embodiment of the invention comprises an API for integrated performance event monitoring across the execution layers of a computer system. The API is an interface implemented by the underlying performance monitoring infrastructure that provides a protocol for the cooperation between two types of monitoring clients: (1) event producers that generate monitoring information, and (2) event consumers that process and regulate the information that is monitored.

Figure 4:
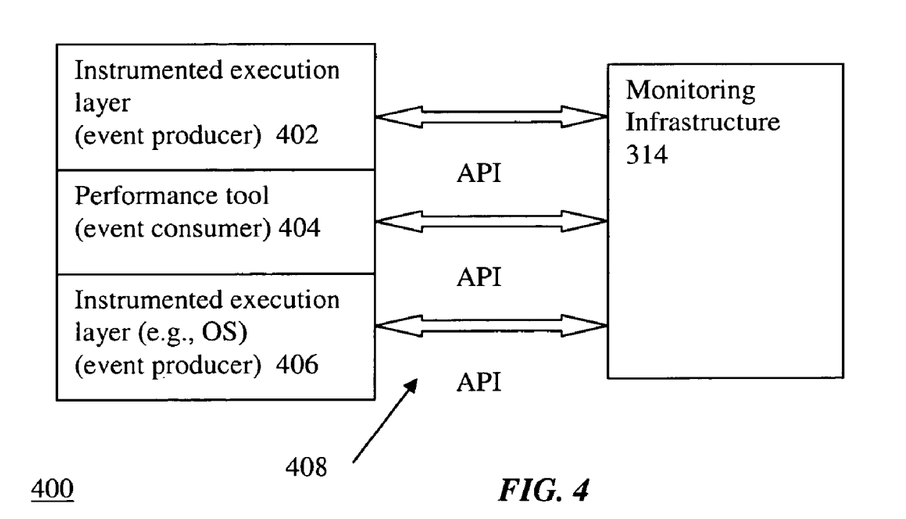
FIG. 4 shows how the monitoring infrastructure interfaces with event producers and consumers through the API.

In FIG. 4, a block diagram 400 illustrates how event producers are interfaced with event consumers through an API 408. An event producer is an execution layer that emits performance events to the monitoring infrastructure through the API. In FIG. 4, the instrumented execution layers 402 and 406 are event producers. Every existing execution layer can be instrumented, either statically, or dynamically, or both, with API event notification calls to become an event producer. A performance tool 404 that is built using the API to automatically analyze and process event information is an example of an event consumer. The API 408 supports both offline and online event consumers. Offline event consumers post-analyze a trace of events that was generated through the API 408 at runtime. Online event consumers use the API to immediately process the event information for use in online performance tuning tools. Using the API 408, clients (i.e. event producers and offline and online event consumers) can be built to implement specific performance monitoring tasks, such as global logging of events or online event processing for performance tuning.

Embodiments of the API can include the following features.

(1) Vertical event integration and correlation: The API 408 using the invention provides a uniform way to relate performance events from different layers. For example, through the API 408 one can correlate events from the Java Virtual Machine (such as an instance of garbage collection) with performance events in the operating systems (such as lock contention and delays).

(2) Online processing: The API 408 provides programming constructs for online event processing. The API 408 provides basic monitoring abstractions for event processing. By specifying event processing logic through the API 408, the raw event stream may never have to be stored and traced in its complete volume. Instead, through the API 408 the tool developer can instruct the monitoring infrastructure to directly process the event information and expose only the processed instead of the raw event stream to the tool.

(3) Virtualization. The API 408 provides means to specify a virtualization context to differentiate performance events coming from different entities in the system. The virtualization context of an event includes, the responsible O/S thread and process and underlying CPU. For example, when tracking performance events from the operating system (e.g., page faults), the tool may only be interested in those events attributed to the application thread on which the tool is focusing. In this example, the application thread defines the virtualization context.

(4) Platform-independence: The API 408 is platform-independent. All platform-dependent aspects of event monitoring are made transparent by the API implementation, thus clients interested in the performance monitoring data can consume traces from different architectures.

(5) Dynamic monitoring: The API 408 provides interfaces for light-weight instrumentation in the producers layers. Monitoring activity can be dynamically enabled and disabled through API calls in a consumer tool.

Through the above discussed capabilities, the API 408 provides a flexible framework for building monitoring client tools. The API 408 provides monitoring abstractions for easy and fast programming of tools that remove the burden of monitoring implementation. New monitoring tasks can be implemented in a tool without having to make additional changes in the participating executing layers.

The API 408 provides three generic performance monitoring abstractions: events, event statistics, and event callbacks. An event is a basic abstraction of the API 408 and denotes occurrences of a performance phenomenon in the system. The API allows the monitoring of a specific event type to be dynamically enabled or disabled. Event statistics are functions on a stream of events. An example of an event statistics is an event counter that is incremented each time an event of a specific type occurs. Other examples include average value computation or computing histograms. The API 408 includes basic operations on the statistics, such as reading or resetting the current value of the statistic.

An event callback is a routine that, through the API, can be installed to be invoked in response to the occurrence of specific events or event statistics. An event callback is analogous to an interrupt handler that is called in response to an interrupt.

A specific embodiment of the invention may in addition include custom composite interfaces for common combinations of the basic abstractions to allow for more efficient implementation of these combinations on a certain platform.

By providing the above facilities the API 408 facilitates the construction of tools for both online automatic performance tuning and offline performance tracing. By providing basic monitoring abstractions to the tool developer across all execution layers, the API 408 hides implementation details of the execution layer 404 in which the event occurs, such as the code location where the event was raised. Thus, proprietary execution layers can participate in event monitoring by issuing selected events into monitoring infrastructure without having to expose any of the underlying proprietary execution layer code structures. Overall, the API 408 provides a fully integrated and uniform view of performance events across the entire execution stack.

According to this embodiment that demonstrates the advantages of using our API mechanism over other techniques, the API 408 can be implemented as part of a performance and environment monitoring infrastructure. The embodiment provides the following abstractions for programming monitoring clients:

(1) Event abstraction: An event is any type of an action taken by a system. Examples of events are: cache misses, page faults, operating system interrupts, garbage collection invocations, dynamic compiler invocations, and transaction completions. An eventSet is a grouping of events into a set. All the events in a set can be handled as a single entity (e.g., a single part of memory such as a buffer). Sets of events are a convenient abstraction for operating on a group of events such that all the events are accessed and manipulated through a single API call. Operations include starting, stopping, resetting, and reading an event or a set of events. An event attribute is a datum associated with an event. For example, a page fault event may have as an attribute the address that caused the page fault.

(2) Event statistics and event statistics operations: Allows monitoring clients to create and operate on (sets of) event statistics across execution layers. Statistics are types of statistical event functions such as counters.

(3) Event callback abstraction: This allows monitoring clients to specify custom reactions to an event notification. Through the callback mechanism the client can specify arbitrary computation to occur when a event notification call is made from an event producer.

Events are specified in a system-wide generic event specification format. Based on the event specification, a set of tools is built to process the event specification in order to generate programming language-specific files and stubs.

Figure 5:
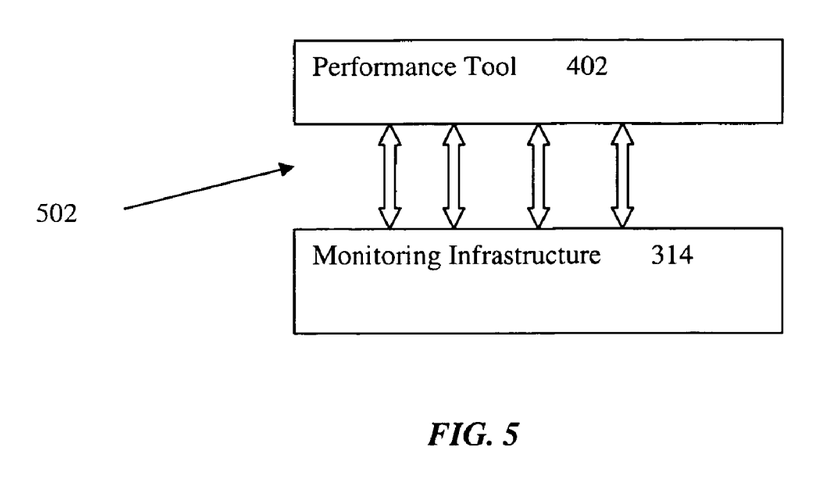
FIG. 5 shows how a performance analysis tool can be built on top of a monitoring infrastructure that exposes an API.

FIG. 5 shows a performance analysis tool 500 built on top of the monitoring infrastructure 314 that exposes an API 408.

Figure 6:
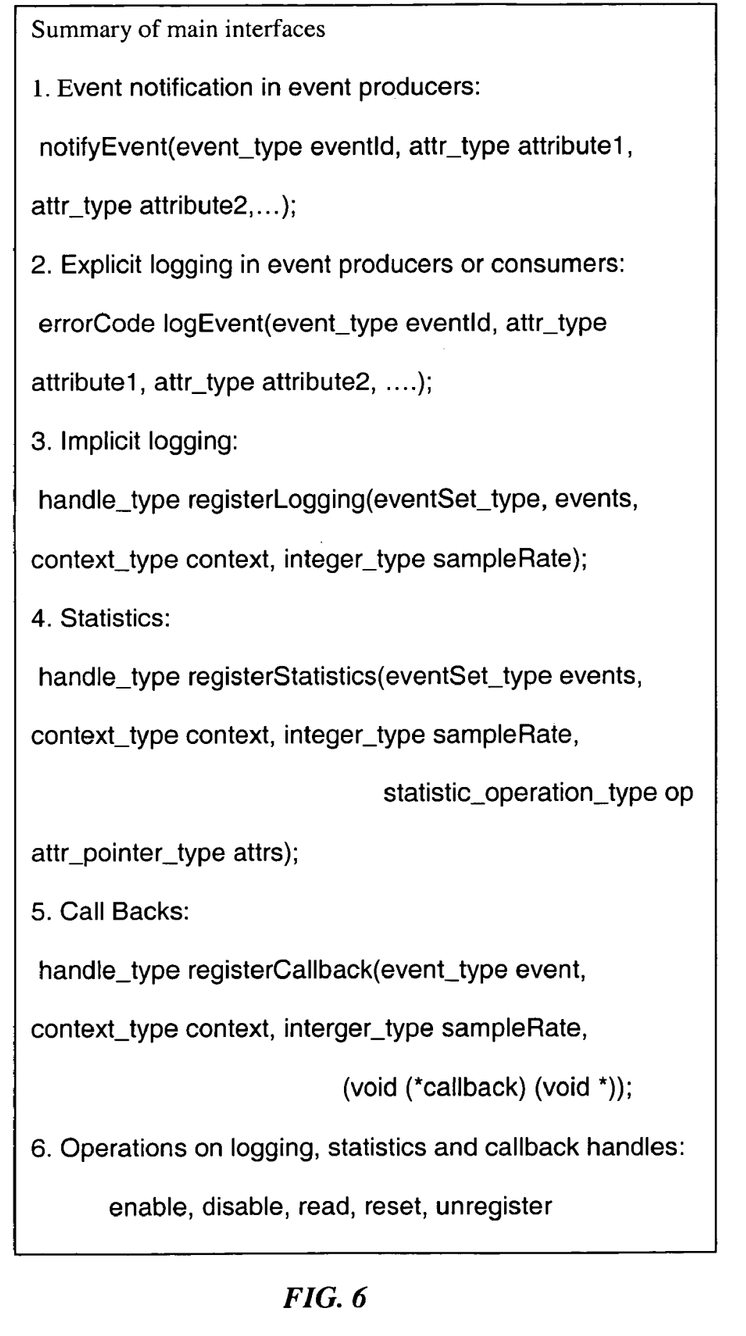
FIG. 6. shows an overview of the main interfaces of an API according to an embodiment of the invention.

FIG. 6 provides an overview of the main interfaces of the API 408. These interfaces are discussed in detail in the following discussion.

Context.

The preferred embodiment allows a monitoring consumer to constrain the scope of monitoring by a specified context; that is, specifying the state that the system must be in when an event occurs for that event to be monitored. Each monitoring client determines the context for the events which it is interested in. For example, a context may be specified as a tuple <cpuid, pid, tid> that specifies system state as the CPU (cpuid), process (pid) and thread (tid) identifiers. Any element of the tuple can be specified as UNRESTRICTED; that is, monitoring will not be constrained by this element. Therefore, system-wide monitoring is specified by <UNRESTRICTED, UNRESTRICTED, UNRESTRICTED>, CPU specific monitoring is specified by <cpuid, UNRESTRICTED, UNRESTRICTED>, process specific monitoring for a particular CPU is specified by <cpuid, pid, UNRESTRICTED>, and thread specific monitoring for a particular process and CPU is specified by <cpuid, pid, tid>. If process and thread migration across CPU's is allowed, then the CPU component for both process and thread specific monitoring can be specified as UNRESTRICTED. Alternative tuple items may be required to identify contexts. For example, in the context of a parallel application that uses message passing interface (MPI), an MPI thread identifier might be more appropriate than operating system thread identifier. Additional tuple items may be required to identify context. For example, in the context of a Java virtual machine, a Java thread identifier may be required in addition to a operating system thread identifier. The context of an event may further be constrained by spatial limitation of the event scope. For example, memory related events (e.g., a cache miss) may be constrained by a specific memory region to which they refer. Other examples include restricting events by the code region in an application where the events occur, or restricting the events to a set of data structure addresses that are responsible for generating the events.

Event Specification.

The monitoring API is based on a unified event specification repository 316 (in FIG. 3). In one embodiment, the repository contains a definition of each event and its attributes in programming language-independent format using XML (extensible markup language) format, however other formats for specifying the event repository are possible. The XML definitions are used to automatically generate event-specific interfaces and header files in one or multiple programming languages (e.g., C, C++, Fortran, Java, etc.).

The XML specification results in the automatic generation of a record structure definition for the event and various function interfaces as shown in the following sections.

Monitoring Producers.

A monitoring producer may be any layer or component of a layer in the execution stack (see FIG. 1). To interact with the monitoring infrastructure, a monitoring producer is instrumented with event notification calls according to an aspect of the invention. Instrumenting the producers can be done manually or automatically (for example, through a compiler). No other modifications to a layer are necessary to support monitoring. The actions taken to process an event notification call in the monitoring infrastructure is fully programmable through the preferred embodiment functions. In this sense, a producer is passive and only notifies about the occurrence of a particular event in a particular context if the producer has been programmed to react.

Event notification signals to the monitoring infrastructure that an event has occurred and provides a mechanism to pass specific event attributes to the monitoring infrastructure.

We now discuss actions that take place to process an event notification call. When an event notification call is made, we determine the current context tuple consisting of a cpu id, a process id and a thread id. If no event logging, statistics or callback has been registered by a monitoring consumer for the current context, the event notification call does nothing. If a consumer has registered event logging for this event in the current context, and if the corresponding logging handle has been enabled then we write an event record into an event buffer or to disk.

If a consumer has registered an event statistics for this event in the current event context, and if the statistic has been enabled, then the statistics is updated by applying the statistics function to the current event. Finally, if a consumer has registered an event callback for this event in the current event context, and if the callback has been enabled then the callback function will be invoked.

The preferred embodiment provides event-specific notification interfaces that are automatically generated from the XML event specifications. An event-specific notification explicitly passes as arguments the attributes of the event. A concrete embodiment of the notification interface for the page fault event may be specified as follows:

notifyPageFaultEvent(attr_type threadPtr, attr_type faultAddr, attr_type faultIAR);

In this example, the page fault event has as event attributes, which are passed as arguments (of type: attr_type), a pointer to the thread that was executing when the page fault occurred (threadPtr), the address that caused the page fault (faultAddr), and the faulting instruction address (faultIAR).

Monitoring Consumer.

Through the preferred embodiment a monitoring consumer can program a specific reaction to an event notification. The consumer can specify both the context and level of detail of the event. For example, a tool may specify both the process and the thread identifier of a specific application process because it is interested in only the page faults generated by that process and not in the page faults generated by other applications that happen to be executing at the same time. On the other hand, an operating system may specify only a CPU identifier because it is interested in all the page faults that are generated by any application executing on that processor.

The level of detail of an event determines the amount of information that is made available about that event. For example, a consumer might want an event and all of its attributes to be saved every time that the event executes, while another client might only want to count the number of times the event occurs, or to compute the maximum value of one of the attributes of an event The preferred embodiment provides two levels of details: logging and statistics. At the logging level, whenever the event occurs in the specified context, the event and its attributes are saved as a log record. At the statistics level, whenever the event occurs in the specified context, an operation is executed that summarizes the event. The operation may count the number of times this event occurs, or compute the maximum, minimum, or average values of one of the event's attributes, or any other statistical measure of interest. To simplify usage, the preferred embodiment provides the data abstraction of a handle for logging and statistics. A handle identifies a set of events, identifies the context for that set, encapsulates the necessary storage that is required to monitor the event set, and encapsulates the operations that can be applied to the storage. For example, at the statistic level, the handle encapsulates the statistics operation and the location that holds the current statistics value. A monitoring consumer accesses the monitored data through the handle. If several handles have been specified and enabled for the same event, event notification will execute each handle in turn in unspecified order.

Logging.

Event logging describes the process of writing an event record based on the event's XML specification into an event buffer. Event logging may be triggered explicitly through calls to event logging functions or implicitly as the event occurs. For both explicit and implicit logging, a timestamp will automatically be inserted into the event record.

Explicit Logging.

The preferred embodiment contains explicit event logging interfaces that are automatically generated from the XML event definition. For example, from the XML page fault specification of a page fault event the following concrete interfaces may be automatically generated:

errorcode logPageFalutEvent(attr_type threadptr, attr_type faultAddr, attr_type faultIAR);

The arguments passed to logPageFaultEvent are the same as for notifyPageFaultEvent. The explicit logging functions may be called from both, monitoring consumers or producers.

Implicit Logging.

A monitoring consumer can register a set of events in a particular context at the logging level of detail. Registration returns a logging handle, allocates the necessary data structures needed to log any event in this set, and informs the event notification calls about this handle. The logging registration interface in the preferred embodiment is defined as follows:

handle_type registerLogging(eventSet_type events, context_type context, integer_type sampleRate);

To register an event set for logging, the set of events is passed as the "events" argument (of type eventSet_type). The "context" argument (of type context_type) specifies the context for the event set. Finally, the "sampleRate" argument (of type integer_type) is passed to specify how many times an event in the set must occur in the handle's context before the event is logged for this handle. In particular, if the event set contains two events, A and B, and sampleRate is three, then every third A event is logged and every third B event is logged. Registration of logging returns a logging handle (of type handle_type). The default value of the sampleRate is 1, that is, every event is logged.

Statistics.

A monitoring consumer can register a set of events in a particular context at the statistic level of detail. Registration returns a statistics handle, allocates the necessary data structures needed to compute a statistic on any event in the set, and informs event notification about this statistic handle. The logging registration interface in the preferred embodiment is defined as follows: handle_type registerStatistics(eventSet_type events, context_type context, integer_type sampleRate, statistic_operation_type op, attr_pointer_type attrs);

The "events" argument (of type eventSet_type) specifies the set of events associated with this handle. The "context" argument (of type context_type) specifies the context for the event set. The "sampleRate" argument (of type integer_type) determines how many times an event in the statistics' event set must occur in the handle's context before the statistic is computed on the event. The "op" argument (of type statistic_operation_type) specifies the statistics operation that is to be applied to the "attrs" argument (of type attr_pointer type), which specifies a list of attributes of the events, one for each event in the event set. The number of entries in attribute list "attrs" must be the same as the number of events in the event set "events". Example of operations include "count", which counts the number of times an event occurs; "max", which computes the maximum value for an attribute of an event; "min", which computes the minimum value for an attribute of an event; and "average" computes the average value for an attribute of an event. The "max", "min", and "average" operators can be considered a generalization of counting. Other statistics such as standard deviation, etc., are considered as consistent with this embodiment. Registration of a statistic returns a statistics handle (of type: handle_type).

Callback.

A monitoring consumer can register a callback in a particular context. Registration returns a callback handle, allocates the necessary data structures needed to execute the callback, and informs the event notification calls about this handle. The callback registration interface in the preferred embodiment is defined as follows:

handle_type registercallback(event_type event, context_type context, interger_type sampleRate, (void (*callback)(void*));

The "event" argument (of type event_type) specifies the event associated with this handle. The "context" argument (of type context_type) specifies the context for the event set. The "sampleRate" argument (of type integer_type) determines how many times an event in the set must occur in the handle's context before the event is logged for this handle. The final "callback" argument, which is shown in the "C" programming language syntax, specifies the function that is invoked when the call back is triggered. The callback function is invoked with a pointer to the event log record of the event that triggered the callback. Registration of a callback returns a callback handle (of type handle_type).

Handle Operations

The registration of logging, statistics and callback returns a handle to the monitoring consumer. The consumer can use a handle interface, provided by the preferred embodiment, to trigger operations on the handle objects. The preferred embodiment interface includes the following handle operations:

1. Enable: After a handle has been created through registration, the handle can be enabled. Once the handle is enabled, whenever an event notification for an event in the handle's event set is executed in the handle's context with the handle's specified number of times for this event, the handle's action is applied to the event. For a logging handle, the action is that the event and all of its attributes are logged. For statistics handle, the action is that the handle's operation is applied to the handle's accumulator for the event. For callback handle, the action is a function call that passes the event as a parameter.

2. Disable: After a handle has been enabled, the handle can be disabled. No action is taken for a disabled handle. That is, whenever a handle's event occurs in the handle's context and an event notification call executes, then no action is taken for this handle. It is a null operation to disable a handle that has not been enabled.

3. Read: After a handle has been enabled, the handle's internal data structure is read through this operation. For a logging handle, the values returned are all the records that have been logged for this handle. For a statistics handle, the values returned is an array of statistics values one for each event in the event set with which the statistics was registered. Callback handles do nothing if read.

4. Reset: This operation resets the internal data structures for the handle. Resetting a logging handle eliminates all previous log records for this handle. Resetting a statistics handle resets all values associated with the handle.

5. Unregister: After a handle has been created through registration, the handle can be unregistered; that is, the handle is disabled and the data structures associated with the handle are released. After a logging handle is unregistered, if an event in the handle's event set occurs in the handle's context, no event is logged for this handle. After a statistics handle is unregistered, if an event in the handle's event set occurs in the handle's context, no statistics are computed for this handle. After a callback handle is unregistered, if an event in the handle's event set occurs in the handle's context, no function is called for this handle. After a handle is unregistered, any operation that is applied to that handle is a runtime error.

EXAMPLES

We now provide a number of examples of how the preferred embodiment can be used.

System-Wide Monitoring

This example demonstrates how to use the interface to log every event that occurs in the system. Assume the event set "AllEvents" contains all events that are specified in the Unified Specification Repository 316; that is, AllEvents={page faults, . . . }. "AllEvents" is defined by the tools that process the XML event specification. Assume further that "GlobalContext" is defined to specify system-wide context; that is, all of the context's items are defined as UNRESTRICTED.

```
handle_type allEvents = registerLogging(AllEvents, GlobalContext, 1);
allEvents.enable( );
```

After allEvents is enabled, whenever any event in the set AllEvents occurs, it is automatically logged. To stop system-wide logging, the allEvents handle is disabled. The log records can be read by calling the read operation. Finally, the handle's internal data structures that captured the logged events are released when the handle is unregistered.

```
allEvents.disable( );
log = allEvents.read( );
allEvents.unregister( );
```

Process Specific Monitoring

We now discuss an example of how to monitor process specific events. In this example, the operating system (OS) is the monitoring consumer that is interested in monitoring the events associated with a Java virtual machine (JVM). After starting the JVM, the OS creates a statistics handle by registering the JVM's process identifier to count the JVM process specific events. After a statistics handle is created, the handle is enabled. Events for other processes that are running concurrently with the JVM are not recorded with the JVM's handle.

```
JVM_process = startExec(JVM);
context_type JVM_specific = {UNRESTRICTED,
JVM_process, UNRESTRICTED};
statistics_type jvm = registerStatistics(AllEvents, JVM_specific, 1,
count, null};
error_type error = jvm.enable( );
```

After the OS destroys the JVM process, the statistics are disabled, read, and finally the handle is unregistered.

```
destroy(JVM_process);
error = jvm.disable( );
void *stats = jvm.read( );
error = jvm.unregister( );
```

Thread Specific Monitoring

We now discuss an example of how to monitor thread specific events. In this example, a Java virtual machine (JVM) is the monitoring client.

In particular, the JVM is interested in monitoring the events associated with one of its threads. After creating a thread, the JVM registers the set of Java thread events in a thread specific context. We assume that JavaThreadEvents is defined by the tools that process the XML event specification, and it identifies all of the events associated with a Java thread.

```
// The XML specification for JavaThreadEvents is not shown here
JVM_thread = createJavaThread(...);
context_type thread_context = {UNRESTRICTED, JVM_process,
JVM_thread};
statistics_type jvmThread =
    registerStatistics(JavaThreadEvents, thread_context, 1, count, null);
error_type error = jvmThread.enable( );
```

The jvmThread handle is disabled, read, and unregistered before the Java thread is destroyed.

```
// inside of JVM
error = jvmThread.disable( );
void *stats = jvmThread.read( );
error = jvmThread.unregister( );
destroyThread(JVM_thread);
```

Interval Monitoring: Garbage Collection.

We now discuss an example of how to aggregate a set of events E that occur between a pair of marker events M. The pair of events M defines an interval during which the events E are aggregated. In this example, the monitoring client is a Java virtual machine (JVM). The interval is defined by the garbage collection (GC) start and end events. The events E that are aggregated during a GC are the number of page faults, and the number of data cache misses. An event set, events, is defined to contain these two aggregated events. The event set is registered as a statistics with the count operation. A process specific context is created for this JVM. A callback is registered for the start of a GC with the gcStartEvent event for this JVM with the jvmContext context such that when the JVM starts a GC the function gcstart is invoked with the gcStartEvent log record passed as the first parameter. The function enables and resets the stats handle which counts the number of page fault and data cache misses, and save the timestamp of the GC start event. A callback is registered for the end of a GC with the gcEndEvent event for this JVM with the jvmContext context such that when the JVM ends a GC the function gcEnd is invoked with the gcEndEvent log record passed as the first parameter. The function disables the stats handle and then logs a GC interval event, gcIntervalEvent, that contains the log record for the GC end event, the time stamp of the start of the interval and the number of page faults and cache misses that occurred during the GC. After both callback handles are enabled, a callback will be triggered whenever this JVM starts or ends a GC.

When the JVM is no longer interested in counting the number of page faults and data cache misses that occur during a GC, the handles are unregistered.

```
// The XML specifications for the events gcStartEvent and gcEndEvebt are not
// shown here
eventSet_type events = {pageFault, dataCacheMissEvent};
statistics_type stats = registerStratistics(events, JVM_specific, 1, count, null);
timestamp_type gcStartTime = null;
context_type jvmContext = {UNRESTRICTED, myProcessId( ), JVM_thread};
handle_type gcStartHandle = registerCallBack(gcStart, jvmContext, 1, gcStart( ));
```

-continued

```
handle_type gcEndHandle = registerCallBack(gcEnd, jvmContext, 1, gcEnd( ));
gcStartHandle.enable( );
gcEndHandle.enable( );
...
gcStartHandle.unregister( );
gcEndHandle.unregister( );
stats.unregister( );
...
gcStart(void *record) {
    gcStartRecord *rec = (gcStartRecord *) record;
    gcStartTime = rec->timestamp;
    stats.enable( );
    stats.reset( );
}
gcEnd(void *record) {
    stats.disable( );
    long long statsValues[2] = stats.read( );
    timestamp_type gcEndTime = ((gcEndRecord *) record )->timestamp;
    // the XML specification for GcIntervalEvent is not shown here
    logGcIntervalEvent(gcStartTime, gcEndTime, statsValues[0], statsValues[1]);
}
```

Interval Monitoring: Page Faults.

We now present another example that shows how callbacks are used to match a pair of events to form an interval. The monitoring client is the operating system (OS). The interval is defined by the start and end of a page fault. Because page faults can be interrupted, care must be taken in how page fault intervals are constructed. In particular, if multiple outstanding page faults can occur at once, we want to make sure that the page fault intervals that are created pair the page fault start and end events correctly. Two callbacks are registered: one that is triggered on a page fault start event, and another on a page fault end event. When a page fault start event occurs, pageFaultStart is invoked and places the page fault start event's log record in a hash table indexed by the thread id threadPtr. When a page fault end event occurs, pageFaultEnd is invoked and generates a page fault interval by looking up the page fault start log record in the hash table that has the same thread identifier and using the page fault start log record's time stamp as the start of the interval. Notice that only a subset of the page fault start and end events' attributes are logged.

Histogram.

We now present an example of how a callback can be used to generate a histogram of the pages fault addresses. The monitoring client is the operating system. A callback is registered for a page fault event in the system-wide context. That is, whenever a page fault occurs the function pageFaultHistogram is called, and it is passed the page fault's attributes. The method increments an integer array indexed by the faulting address shifted by the log of the page size. At some later time, the operating system can disable the callback, and examine the array to determine what region of memory has the most page faults.

```
Integer_type memory[n_pages];
handle_type cb = registerCallBack(pageFaultEvent, GlobalContext, 1,
pageFaultHistogram( ));
    pageFault.enable( );
...
    pageFaultHistogram(void *record) {
```

```
    Hashtable pgflts = new Hashtable( );
    callback_type pageFaultCB = registerCallBack(pageFault, GlobalContext, 1,
pageFaultStart);
    callback_type pageFaultDoneCB =
        registerCallBack(pageFaultDone, GlobalContext, 1, pageFaultEnd);
    pageFaultCB.enable( );
    pageFaultDoneCB.enable( );
...
    pageFaultStart(void *start) {
        pageFaultRecord *rec = (pageFaultRecord *) start;
        pgflts.put(rec->threadPtr, rec);
    }
    // The XML specification for the PageFaultInterval event is not shown here
    pageFaultEnd(void *end) {
        pageFaultRecord *rec = (pageFaultRecord *) end;
        PageFaultRecord *start = (PageFaultRecord *)pgflts.get(rec->threadPtr);
        If (start != null) {
            logPageFaultInterval(start->timestamp, rec->timestamp, rec->faultAddr);
            hash.remove(rec->threadPtr);
        } else {
            // generate error message!
        }
            }
```

-continued

```
    pageFaultRecord *rec = (pageFaultRecord *) record;
    integer_type pageIndex =
        rec->faultAddr >> LOG_PGFLT_SIZE;
    memory[pageIndex]++;
}
```

Periodic Monitoring.

We now discuss how a callback can be used to periodically log hardware performance monitor event values. The monitoring client is the operating system. A callback is registered to call a method every ten million cycles in the system-wide context, GlobalContext. That is, whenever ten million cycles execute the method periodic is called.

The method logs a periodic interval that contains the hardware performance monitor values, skipping the logging of the first cycleEvent.

```
    statistics_type hpmCounters =
        registerStatistics({Cycles, Instructions, L1DataCacheMiss, branchMisses},
                GlobalContext, 1, count, null);
    handle_type periodic = registerCallBack(cycleEvent, GlobalContext, 10000000,
periodic);
    boolean firstPeriod = true;
    periodic.enable( );
    ...
    periodic(void *record) {
        cycleEventRecord *cycle = (cycleEventRecord)record;
        if (firstPeriod) {
            firstPeriod = false;
        } else {
            hpmCounters.disable( );
            long long counterValues[4] = hpmCounters.read( );
            // the XLM specification of the HPMintervalEvent is not shown here
            logHPMintervalEvent(cycle->timestamp-10000000, cycle->timestamp,
counterValues[0],
                        counterValues[1], counterValues[2], counterValues[3]);
        }
        hpmCounters.enable( );
    }
```

Therefore, while there has been described what is presently considered to be preferred or illustrative embodiments, it will be understood by those skilled in the art that other modifications can be made within the spirit of the invention.

We claim:

1. A monitoring method for monitoring a computer system, the monitoring method comprising steps of:
    defining one or more events to provide a unified specification, at runtime;
    registering at least one of the event to be detected, wherein the event is selected from a group consisting of logging the events to a single logical entity, gathering statistics of the events to the single logical entity, and handling of the events in a customized manner;
    creating a consumer of the at least one of the one or more events registered using the unified specification;
    gathering statistics of the one or more events registered, the statistics selected from a group consisting of a count, a maximum, a minimum, an average, a median, a standard deviation, and a variance;
    handling the one or more events registered in a customized way by allowing the definition of a callback routine to be invoked when the one or more events occurs;
    registering an entry specifying events to occur only within a specific context, wherein the context is selected from the group consisting of a partition, an operating system, a process, and a thread;
    detecting an occurrence of at least one of the one or more events registered; generating a monitoring entry each time at least one of the one or more events is detected;
    determining the performance of the system; monitoring the performance of the system;
    dynamically enabling and disabling the step of generating monitoring entries based on the performance determination;
    dynamically enabling and disabling the step of detecting of an occurrence based on the performance determination;
    determining security violations;
    specifying the events registered to occur at intervals, specific frequencies, or based on triggers;
    deregistering the event registered; and
    entering each monitoring entry generated into a single logical entity.

* * * * *